Jan. 17, 1956  D. A. EDGECOMBE  2,731,123
DIE CHANGING ARRANGEMENT FOR METAL WORKING APPARATUS
Filed Jan. 30, 1953

INVENTOR.
DAVID A. EDGECOMBE
BY
ATTORNEY

United States Patent Office 2,731,123
Patented Jan. 17, 1956

2,731,123

DIE CHANGING ARRANGEMENT FOR METAL WORKING APPARATUS

David A. Edgecombe, Beaver Falls, Pa., assignor to The Babcock & Wilcox Company, New York, N. Y., a corporation of New Jersey Application January 30, 1953, Serial No. 334,211

6 Claims. (Cl. 193—38)

This invention relates to means for changing work engaging elements of metal working apparatus and, more particularly, to a system or arrangement for facilitating the changing of dies in metal extrusion apparatus.

In the formation of metal shapes by extrusion, a block or billet of metal at an elevated temperature is forced under high pressure to flow through a die having an opening corresponding to the desired cross-sectional shape of the extrusion to be produced. By way of example, the temperature of the metal may be 2300 F., in the case of steel.

In a typical extrusion press, a front and rear platen are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage and forward of the container. This carrier is mounted for movement into and out of the forward platen to move the die into and out of operative relation with the exit end of the container.

When an extrusion is to be made, a die holder and die assembly is mounted on the rear face of the carrier and the latter is moved rearwardly into the forward platen to engage the die in a recess in the forward end of the container and coaxial with the container passage. The carrier is then locked to the forward platen, after which the container is moved forwardly to seat against the die holder. After a heated billet has been loaded into the container, the ram is moved forwardly under very high pressure to force the billet outwardly through the die. The extrusion is then severed and conveyed away from the press.

Following each extrusion, the die carrier is retracted from the forward platen to permit access to the die holder and die assembly for inspection and replacement of the die. The die assembly is removed from the carrier to a work or processing station where the die is checked and cleaned. Meanwhile, and so as not to delay subsequent extrusions, another die assembly is placed in the die carrier.

The die assembly comprises a die holder ring which receives a backing ring and the die, which assembly may weigh in excess of 40 pounds. The die holder has a flange for engagement with a horseshoe or U-shaped retainer on the rear face of the die carrier. Customarily, this retainer opens vertically upward, requiring the die assembly to be lifted vertically for removal and replacement. At fast rates of operation, such as one extrusion per minute, this requires that a 40-pound-plus assembly be lifted and transported to a work or processing station, and another die assembly placed within the retainer, all in the space of a minute or less. Considering the weights involved and the required rate of changing dies, the operation is highly fatiguing with the usual arrangement.

In accordance with the present invention, it has been found that the required lifting effort can be greatly reduced by orienting the horseshoe retainer so that it opens at an angle of 30 degrees or less to the horizontal. This permits the assemblies to be removed and replaced substantially laterally of the press, with very little lifting being required.

Furthermore, the rate of charging dies can be greatly increased by providing die assembly conveyor means in substantial alignment with the retainer and extending laterally of the press to the work table or processing station where the dies are cleaned and inspected. Preferably, a pair of juxtaposed conveyors are provided, one constructed and arranged to move the removed die assembly toward the table and the other to move the fresh die assembly from the table to the retainer on the die carrier. The two conveyors merge into a single section at the press, and this section is made retractable to clear the path of movement of the die carrier while being extendable into such path to adjacent the die assembly retainer.

With this arrangement, a single operator merely rolls the assembly onto the first conveyor, which takes it to the processing station. The operator rolls the fresh assembly onto the table end of the second conveyor and rolls it off the latter into the die holder retainer. Thus, only a few seconds and only a small manual effort are required for each die change.

For an understanding of the invention principles, reference is made to the following description of a typical embodiment thereof as illustrated in the accompanying drawings. In the drawings.

Figure 1:
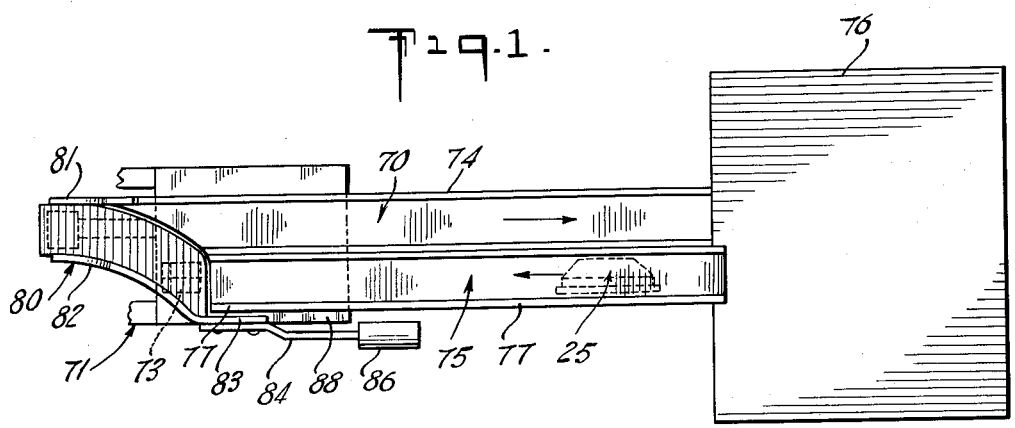
Fig. 1 is a plan view of the die assembly conveyor system of the invention.
Figure 2:
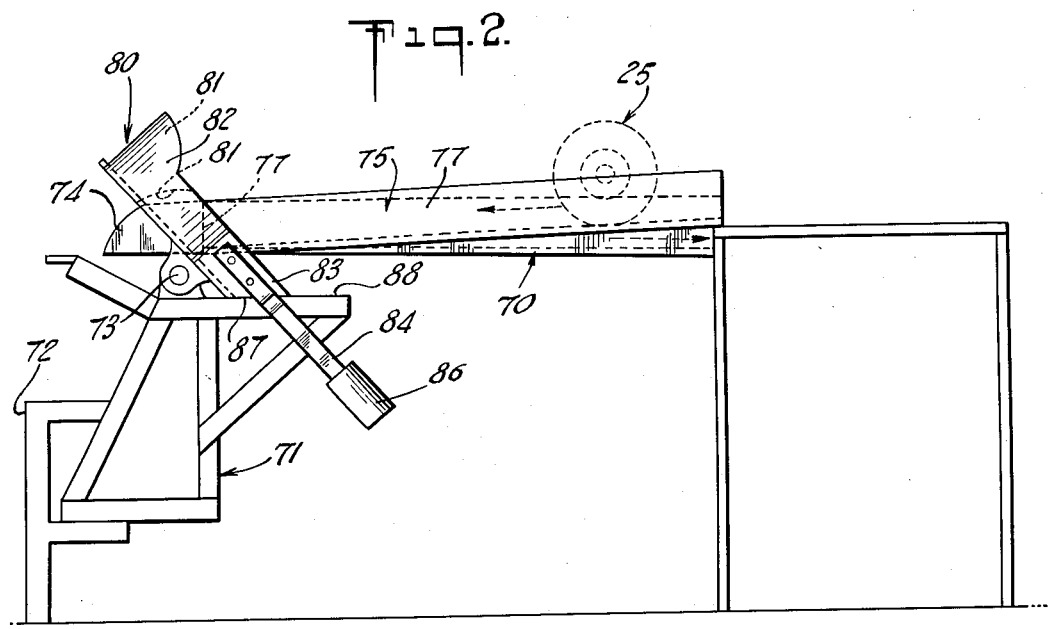
Fig. 2 is an elevation view of the conveyor system.

Referring to the drawing, the die assembly conveyor system is arranged to extend at substantially right angles to the line of operation of the extrusion press (or other meal working apparatus) and is substantially alined with the position assumed by the die carrier when moved forwardly away from the front platen of the extrusion press.

The die changing arrangement comprises a pair of juxtaposed channel chutes 70 and 75 extending, substantially normal to the extrusion press axis, from the runout table or conveyor to a processing station or work table 76. The inner ends of the chutes are supported on a suitable bracket 71 secured to the supporting framework 72 of the runout conveyor. The chutes have a width just slightly greater than the thickness of die assembly 25 and a height substantially equal to the radius of the assembly. Thereby, the die holder, die backing ring, and die are maintained assembled as the assembly is rolled along either of the two chutes.

The two chutes terminate at a point somewhat outside the path of travel of the die carrier. At this point, a channel chute section 80 is hinged to the bracket 71, as at 73. The loading chute 70 slopes downwardly toward table 76 and is substantially aligned with the horseshoe channel 43 when the die carrier is in the retracted position. Chute section 80 has a flange 81 substantially aligned with the outside flange 74 of chute 70. The other flange 82 of section 80 extends outwardly from the line of juxtaposition of chutes 70 and 75 toward the outside flange 77 of chute 75, being extended beyond the inner end of this chute to overlap flange 77 as at 83.

Extension 83 has secured thereto an operating handle 84 which projects outwardly therefrom and has a weighted outer end 86. This weight biases section 80 to normally swing up out of the path of travel of the die carrier. This upward movement is limited by a sloping end 87, on extension 83, which engages a stop 88 forming part of support bracket 71. The chute section 80 thus forms a continuation of both chutes 70, 75, and its free end substantially aligns with the opening between the arms of the U-shape die assembly flange 42 and recess 43. It should be noted that loading channel 75 slopes downwardly from table 76 toward the die carrier.

The operation of the die assembly changing arrangement is as follows. When the carrier 15 reaches the die assembly changing position, chute section 80 is tilted downwardly and a die assembly 25 is rolled out of the horseshoe retainer recess onto section 80 and guided into chute 70. The assembly rolls along chute 70 to table 76, where it is disassembled, inspected, cleaned and reassembled.

Meanwhile, a fresh die assembly 25, which has previously been placed in chute 75, is rolled therealong, onto chute section 80, and into the die assembly retainer. After chute section 80 is swung out of the way, the die carrier is re-inserted into axial recess of the press platen and, before the container is engaged with the die holder, the carrier is locked into the platen.

The invention arrangement, by virtue of orienting the die assembly horseshoe retainer at only a small angle to the horizontal, eliminates most of the manual lifting of the die assembly as previously required. The chutes 70, 75, 80 eliminate the necessity of manually transporting the die assemblies between the die carrier and the work table 76. The sloping of the two chutes 70, 75 greatly facilitates the movements of the die assemblies while assuring the three parts thereof being retained assembled. The chutes also act as magazines to hold a plurality of die assemblies.

While a specific embodiment of the invention has been shown and described in detail to illustrate the application of the invention principles, it will be understood that the invention may be embodied otherwise without departing from such principles.

What is claimed is:

1. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; and a channel chute section hingedly mounted at said one end of the chutes with its hinge end longitudinally aligned with one chute and its free end longitudinally aligned with the other chute.

2. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; a channel chute section hingedly mounted at said one end of the chutes with its hinge end longitudinally aligned with one chute and its free end longitudinally aligned with the other chute; and means biasing said chute section upwardly about its hinge end.

3. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; a channel chute section hingedly mounted at said one end of the chutes with its hinge end longitudinally aligned with one chute and its free end longitudinally aligned with the other chute; and an elevated work surface at the opposite end of said chutes at the level of the opposite end of one chute.

4. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; a channel chute section hingedly mounted at said one end of the chutes with its hinge end longitudinally aligned with one chute and its free end longitudinally aligned with the other chute; and an elevated work surface at the opposite end of said chute at the level of the opposite end of one chute and above the level of the opposite end of the other chute.

5. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; a channel chute section hingedly mounted at said one end of the chutes with its hinge end longitudinally aligned with one chute and its free end longitudinally aligned with the other chute; and an elevated work surface at the opposite end of said chutes at the level of the opposite end of one chute and above the level of the opposite end of the other chute; said work surface being included in said chute supporting means.

6. Transport means for transferring a metal working component between metal working apparatus and a processing station; said transport means comprising, in combination, a pair of substantially juxtaposed elongated channel chutes sloping in opposite longitudinal directions; means supporting said chutes in elevated relation, the chutes, at one end, being at substantially the same elevation; a channel chute section hingedly mounted at said one end of the chutes with its hinge end longitudinally aligned with one chute and its free end longitudinally aligned with the other chute; means biasing said chute section upwardly about its hinge end; and an elevated work surface at the opposite end of said chutes at the level of the opposite end of one chute.

References Cited in the file of this patent

UNITED STATES PATENTS

| 1,194,819 | Clark | Aug. 15, 1916 |
| 1,393,580 | Schranz | Oct. 11, 1921 |
| 1,452,608 | Kirst | Apr. 24, 1923 |
| 1,703,773 | Lee | Feb. 26, 1929 |
| 1,935,286 | Born | Nov. 14, 1933 |
| 2,176,364 | Skinner et al. | Oct. 17, 1939 |
| 2,188,076 | Dinzl | Jan. 23, 1940 |
| 2,352,960 | Lorant | July 4, 1944 |
| 2,388,558 | Loewy | Nov. 6, 1945 |

FOREIGN PATENTS

| 602,176 | Germany | Sept. 3, 1934 |
| 636,744 | Germany | Oct. 15, 1936 |
| 684,794 | Germany | Dec. 5, 1939 |